United States Patent [19]
Leonard et al.

[11] Patent Number: 5,104,357
[45] Date of Patent: Apr. 14, 1992

[54] VARIABLE RATIO DRIVE SYSTEM

[75] Inventors: George H. Leonard, Darien, Conn.; Martin T. Connolly, Denville, N.J.

[73] Assignee: Hamlin Transmission Corporation, Wilton, Conn.

[21] Appl. No.: 675,500

[22] Filed: Mar. 26, 1991

Related U.S. Application Data

[63] Continuation-in-part of Ser. No. 499,910, Mar. 26, 1990, Pat. No. 5,013,284.

[51] Int. Cl.[5] ............................................. F16H 9/10
[52] U.S. Cl. ........................................ 474/49; 474/53
[58] Field of Search ................... 474/47, 56, 48–50, 474/52, 95, 148, 57, 54–55

[56] References Cited

U.S. PATENT DOCUMENTS

| | | | |
|---|---|---|---|
| 3,643,518 | 2/1972 | Semin et al. | 74/219 |
| 3,913,410 | 10/1975 | Ackerman | 74/217 |
| 3,938,403 | 2/1976 | Donaldson | 74/217 |
| 4,030,373 | 6/1977 | Leonard | 606/61 |
| 4,392,842 | 7/1983 | Skura et al. | 474/205 |
| 4,498,351 | 2/1985 | Ahoor | 744/439 |
| 4,530,676 | 7/1985 | Leonard | 474/49 |
| 4,810,235 | 3/1989 | Husted et al. | 474/56 X |
| 4,816,008 | 3/1989 | Leonard | 474/47 |
| 4,820,244 | 4/1989 | Lander | 474/56 |
| 4,832,660 | 5/1989 | Leonard | 474/49 |
| 4,850,939 | 7/1989 | Chilcote et al. | 474/49 |
| 4,854,921 | 8/1989 | Kumm | 474/49 |
| 4,874,351 | 10/1989 | Jackson | 474/53 X |
| 4,875,894 | 10/1989 | Clark | 474/56 X |
| 4,961,719 | 10/1990 | Wildermuth | 474/56 X |

OTHER PUBLICATIONS

Flat Woven Belts–Engineering Catalog, Belting Industries Co., Inc., pp. 3, 9, 13 (KEVLAR ® & Urethane Drive Belt Specifications).

Primary Examiner—Ramon S. Britts
Assistant Examiner—Roger J. Schoeppel
Attorney, Agent, or Firm—Perman & Green

[57] ABSTRACT

A variable ratio drive mechanism which operates to adjust the path of an endless drive belt in response to a remotely located control input. A plurality of circumferentially spaced sheave segments are respectively mounted in a plurality of radially extending elongated tracks with pairs of opposed tooth-like formations therein. Each sheave segment includes cam/bearing means with multiple camming surfaces and opposed engagement blocks intermediate the cam/bearing means and the tooth-like formations. The engagement blocks are mutually slidably engaged but spring-biased into engagement with the tooth-like formations to thereby detent the sheave segment against radial movement. Each sheave segment has a bearing surface which is engaged by the drive belt when the drive mechanism traverses through a predetermined arc of rotation but is disengaged from the drive belt when outside the predetermined arc of rotation. When a sheave segment is moved radially by a shift cam on the drive mechanism the camming surfaces on the cam bearing means are engaged by and slide along follower surfaces on the engagement blocks until the engagement blocks are disengaged from the tooth-like formations and are caused to move up one or more notches, as necessary. At the new radially disposed location, the engagement blocks are again spring biased into engagement with the tooth-like formations to resume detenting the sheave segment against radial movement. Thus oppositely disposed mating teeth lock totally against radially inward forces and lock moderately against radially outward forces.

19 Claims, 8 Drawing Sheets

180° WRAP

270° WRAP

VARIABLE RATIO DRIVE SYSTEM

This is a continuation-in-part of copending application Ser. No. 07/499,910 filed on Mar. 26, 1990, now U.S. Pat. No. 5,013,284.

FIELD OF THE INVENTION

This invention relates to variable ratio drive mechanisms and more particularly to an improved variable ratio drive mechanism particularly adapted for use with bicycles but capable of use in a host of other applications.

BACKGROUND OF THE INVENTION

Variable speed drives utilizing chains and sprockets have been employed with bicycles for many years. The drawbacks of such systems are well known and are described in U.S. Pat. No. 4,030,373 to the present inventor. That patent discloses a variable ratio transmission for bicycles which includes a plurality of movable sheave segments, each sheave segment having a releasable, toothed retaining means which normally retains the sheave segment at a fixed radial position in a toothed track. That structure is, essentially, a variable diameter pulley or sheave whose diameter is adapted to be selectively adjusted by the rider. A flexible belt is wrapped around and engages different adjacent sheave segments to impart rotary motion to the drive mechanism. The relative position of each sheave segment in its toothed track is adjusted only when a sheave segment comes out of contact with the drive belt.

The mechanism described in the '373 patent for locking each sheave segment into place after adjustment contains relatively small and highly stressed parts requiring close manufacturing tolerances. The setting mechanism can be sensitive to both axial location and warpage. Locking surety also may degrade somewhat with wear.

In U.S. Pat. No. 4,530,676, also to the present inventor, a variable ratio drive mechanism is disclosed which also employs driving and driven sheaves, each of which is provided with a set of adjustable sheave segments. In that mechanism, individual sheave segments are one-piece, belt-loaded-locked units which engage saw-tooth shaped steps along associated trackways. The particular asymmetric geometry shown is such that the belt's force on each sheave segment applies an offset torque which forces the sheave segment's teeth into engagement with opposed saw tooth steps along one side of the track. When each sheave segment becomes free of the force of the belt, it can be engaged by a shifter which causes its teeth to move out of engagement with the track's steps The sheave segment is then radially movable in either an outward or inward manner. In order to unlock the sheave segment's teeth from engagement, means are provided to cause a modest amount of rotation of a segment's teeth so that they can ratchet up or down relative to the track's steps. This design is somewhat less suitable for small sheave diameters than large diameters and for applications involving relatively resilient belts which are subjected to grossly fluctuating driving tensions. Furthermore, the design is adapted only to a single direction drive.

In U.S. Pat. No. 4,816,008, also to the present inventor, there is disclosed still another transmission of the type that includes sheave segments coupled together by a drive belt. That transmission employs a sheave segment locking mechanism which runs the full length of each disk track in the drive mechanism. The locking mechanism described therein is controlled by a fixed path cam whose action is related to the radial position of the sheave. More specifically, the locking mechanism is released and removed from interaction with an individual sheave segment by a cam means which is operative only when the sheave segment is out of contact with the drive belt. Under those circumstances, the sheave segment is free floating and can be either moved inwardly or outwardly by a shift mechanism. In this mechanism, positive and consistent lock-up is dependent upon light springs and free fitting, cooperating parts. Relatively close tolerances are required and lock-up surety may decrease with wear.

Yet another noteworthy prior art construction is disclosed in U.S. Pat. No. 4,832,660, also to the present inventor, which relates to an apparatus for positioning a bearing surface relative to a track. In one embodiment, that invention includes a rotatably mounted drive mechanism which is provided with a plurality of radially oriented tracks. The drive mechanism preferably comprises a pair of parallel drive disks with co-linear, radial tracks having tooth-like formations arranged therein. A movable sheave segment is mounted between each set of co-linear tracks. Each sheave segment comprises two pairs of engagement blocks and two pairs of springs, one pair for each track and a multi-element cam bearing means. Toothed means on the engagement blocks provide means for locking each sheave segment into place in the toothed track. Another broadly similar construction is disclosed in U.S. Pat. No. 4,820,244 to Lander. In both cases, engagement blocks and the multi-element cam bearing means are spring-connected.

In each disclosure, the bearing surface of each sheave segment is engaged by an endless belt when the drive mechanism traverses through a predetermined arc of rotation but is disengaged from the drive belt when outside the predetermined arc of rotation. The multi-element cam locking means associated with each sheave segment is forced by belt pressure to rigidly bias a sheave segment's engagement blocks against the tooth-like formations in the track. Spring means are provided to resiliently bias the engagement blocks into engagement with the track's tooth-like formations so that the sheave segments are lightly detented in place when out of engagement with the drive belt. In each case, detenting action acceptable for certain applications may be insufficient to prevent damaging radial fly-out under speeds routinely experienced in certain other applications.

SUMMARY OF THE INVENTION

The present invention features a novel rearrangement of elements and their geometry designed to prevent fly-out of sheave segments when subjected to high rotational speeds. The invention, then, concerns a variable ratio drive mechanism which operates to adjust the path of an endless drive belt in response to a remotely located control input. A plurality of circumferentially spaced sheave segments are respectively mounted in a plurality of radially extending elongated tracks with opposed tooth-like formations therein. Each sheave segment includes cam/bearing means with multiple camming surfaces and opposed engagement blocks intermediate the cam/bearing means and the tooth-like formations. The engagement blocks are mutually slidably engaged and spring-biased into engagement with the tooth-like formations to thereby detent the sheave segment against radial movement, as in the previously mentioned patents.

Each sheave segment has a bearing surface which is engaged by the drive belt when the drive mechanism traverses through a predetermined arc of rotation but is disengaged from the drive belt when outside the predetermined arc of rotation. When a sheave segment is moved radially by a shift cam on the drive mechanism, the camming surfaces on the cam bearing means are engaged by and slide along follower surfaces on the engagement blocks until the engagement blocks are disengaged from the tooth-like formations and are caused to move up one or more notches, as necessary. At the new radially disposed location, the engagement blocks are again spring biased into engagement with the tooth-like formations to resume detenting the sheave segment against radial movement. For enhanced strength and gripping ability, the drive belt may include a urethane friction member with an integral strength member composed of arimid fibers such as KEVLAR ® brand fiber material produced and sold by E.I. duPont de Nemours and Company of Wilmington, Del., or equivalent material. It should be noted that in the design of the present invention, there is no spring connection between engagement blocks and cam bearing means. Detenting force is transmitted between opposed engagement blocks. The cam bearing means is free to float, either radially inward due to belt pressure, or radially outward due to significant centrifugal forces.

Accordingly, it is an object of this invention to provide an improved variable ratio drive mechanism of simplified design.

It is a further object of this invention to provide an improved variable ratio drive mechanism which exhibits substantial resistance to wear while insuring positive lock-up.

It is a still further object of this invention to provide an improved variable ratio drive mechanism which is insensitive to belt resiliency.

It is another object of this invention to provide an improved variable ratio drive mechanism which is adapted to bidirectional operation and permits relatively relaxed manufacturing tolerances.

It is yet another object of the invention to provide an improved variable ratio drive mechanism which is substantially unaffected by bumping, centrifugal force, or by movement of the drive belt into or out of engagement with a segment.

Still another object of the present invention is to provide a belt drive in which the percentage of belt strength available for useful work, considering the tensioning required to minimize slippage, is remarkably close to 100% and which may, therefore, be two to three times as great as in conventional drive belt systems.

Other and further features, advantages, and benefits of the invention will become apparent in the following description taken in conjunction with the following drawings. It is to be understood that the foregoing general description and the following detailed description are exemplary and explanatory but are not be to restrictive of the invention. The accompanying drawings which are incorporated in and constitute a part of this invention, illustrate one of the embodiments of the invention, and, together with the description, serve to explain the principles of the invention in general terms.

Like numerals refer to like parts throughout the disclosure.

It should be noted that none of the above drawings are drawn to scale and that the segments and tracks are purposely drawn larger than the rest of the assembly to more clearly describe the invention.

DETAILED DESCRIPTION OF THE PREFERRED EMBODIMENT

U.S. Pat. Nos. 4,030,373, 4,530,676, 4,816,008 and 4,832,660, all to the inventor hereof, and U.S. Pat. No. 4,820,244 to Lander, describe variable ratio transmissions which are usable with both bicycles and other apparatus. The disclosures of those patents are expressly incorporated herein by reference.

Although the invention disclosed is described for use in a bicycle transmission, it is to be understood that it may be used in many other applications. In general, its application is for repositioning a bearing surface relative to a track.

Figure 1:
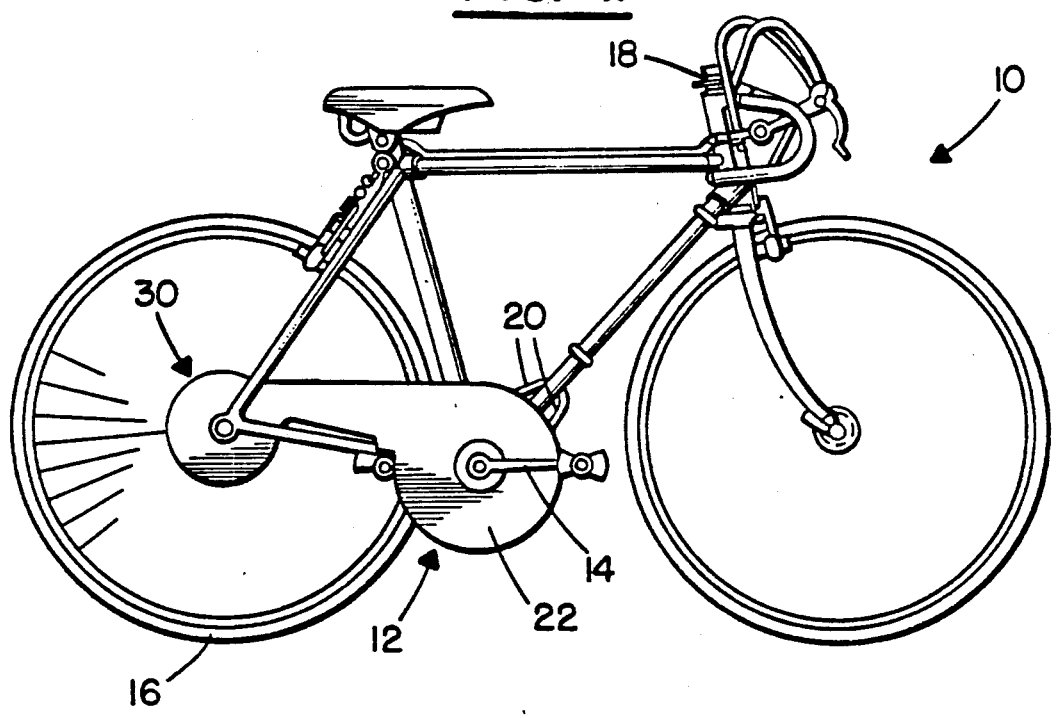
FIG. 1 is a right elevation view of a typical bicycle equipped with a variable ratio drive mechanism embodying the invention.

Referring now to FIG. 1, a bicycle 10, of the commonly accepted form, is shown and includes an adjustable ratio transmission 12. Transmission 12 provides the drive coupling between pedal crank 14 and rear wheel 16. A manual transmission ratio or shift control 18 includes a pivoted finger actuated member that is conveniently operable by the person riding the bicycle. Ratio control 18 enables the rider to control transmission 12 via cable means 20. The details of one form of shift control 18 are disclosed in U.S Pat. No. 4,832,660 and will not be further described herein. Suffice it to say that the movement of shift control 18 one way or the other has the effect of conditioning transmission 12 to change its ratio in progressive steps using force exerted by pedal crank 14. So long as shift control 18 remains off center, continued operation of the pedal crank 14 will cause, within design limitations, continuous step by step change in the transmission's ratio.

Figure 2:
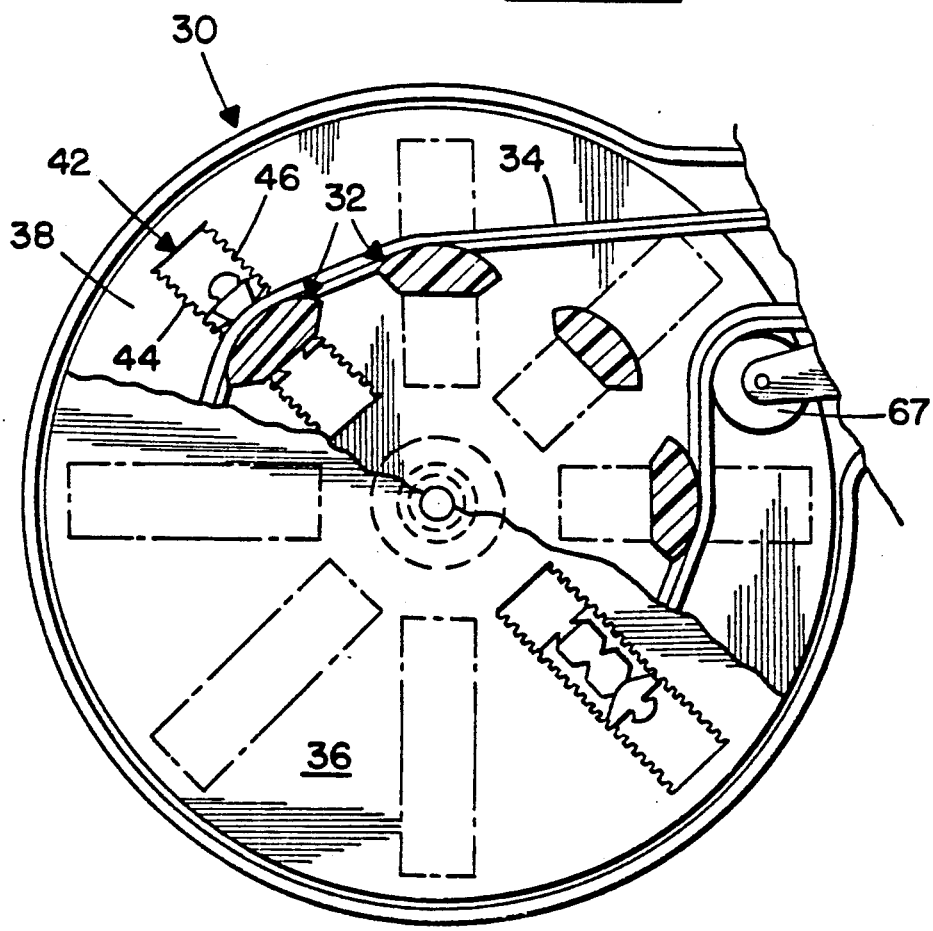
FIG. 2 is a detail right elevation view of the rear wheel portion of variable ratio drive mechanism embodying the invention, a portion of the elevation view being broken away to show the internal arrangement of the sheave segments.

Referring to both FIGS. 1 and 2, transmission unit 12 includes similar front and rear drive mechanisms, both of which include adjustable diameter sheaves. The front drive mechanism includes an adjustable sheave means (not shown) within housing 22 that is coaxial with and operated by pedal crank 14. Transmission unit 12 further includes a rear drive mechanism 30 (see also FIG. 2) which comprises a variable diameter pulley or sheave and includes a plurality of radially adjustable sheave segments 32. An endless member or belt 34 may be in driving or driven frictional contact with each of sheave segments 32. When a selected transmission ratio is in effect, the sheave segments on both the front and rear sheaves of bicycle 10 are detented at a fixed radius so as to enable the creation of the desired transmission ratio.

Figure 3:
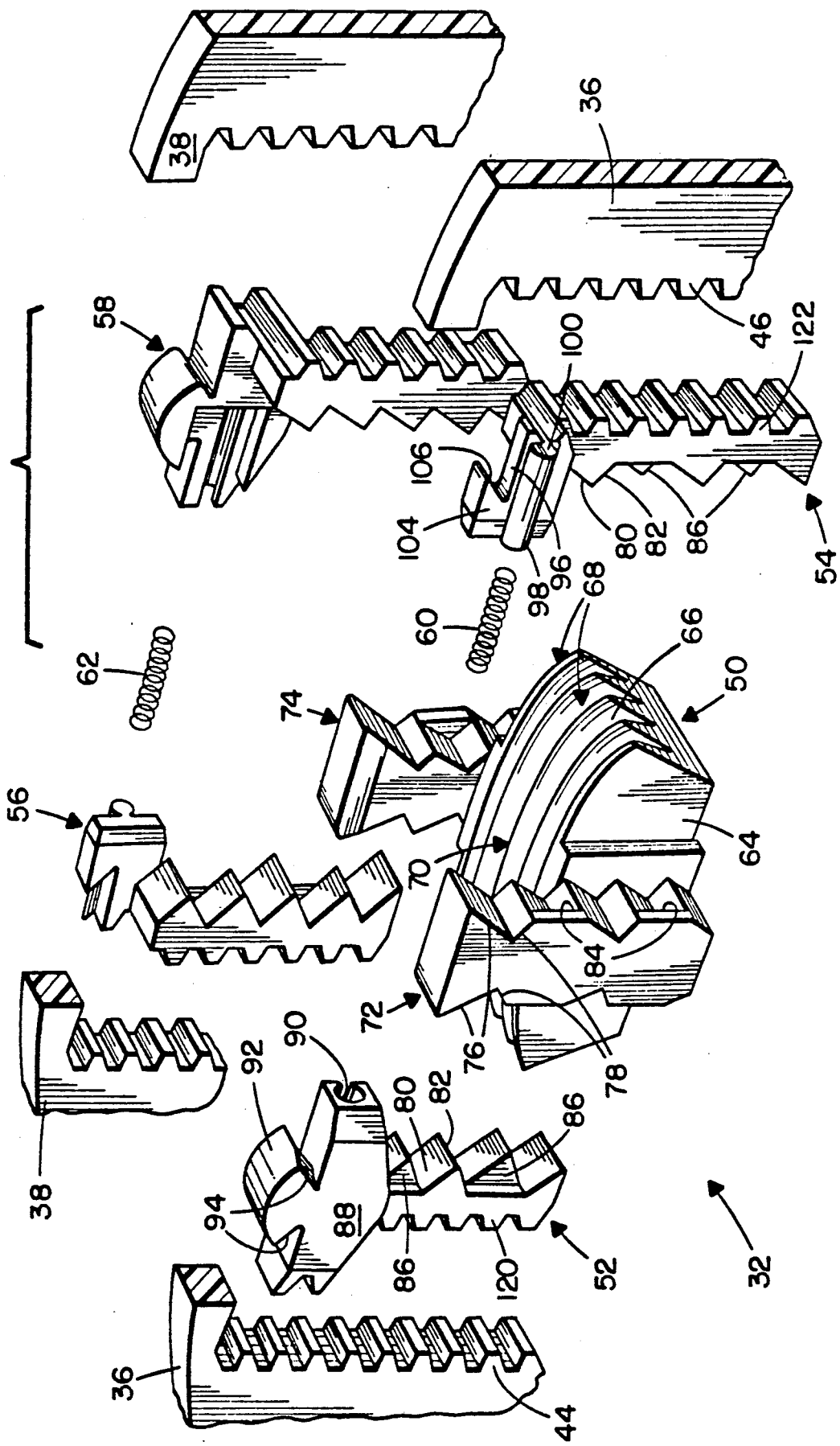
FIG. 3 is a fragmentary exploded perspective view of a sheave segment shown in FIG. 2.

Referring to FIGS. 2 and 3, drive mechanism 30 is further comprised of two, coaxially spaced-apart, disks 36 and 38 which form a unitary rotatable member coupled to a clutch and supported by roller bearings (not shown). Each of disks 36 and 38 is provided with a plurality of extended, toothed slots 42, which are radially and co-linearly aligned on disks 36 and 38, respectively.

Each of slots 42 has formed therein, on opposing surfaces thereof, tooth-like formations such as teeth 44 and 46, respectively. Teeth 44 and 46 have flattened crowns to minimize wear and pounding, which could tend to damage sharp points, were they present. In FIG. 2, each of sheave segments 32, which are shown in the area where disk 36 has been cut away, have had their outer engagement blocks removed. This structure will be better understood by referring to FIG. 3 wherein there is shown an exploded view of a complete sheave segment and its associated tracks.

Each sheave segment 32 comprises five main components: a cam/bearing means 50, a right-rear engagement block 52, a right-forward engagement block 54, a left-rear engagement block 56 and a left-forward engagement block 58. In addition, two compression springs 60 and 62 are further provided and will be discussed below.

Figure 4:
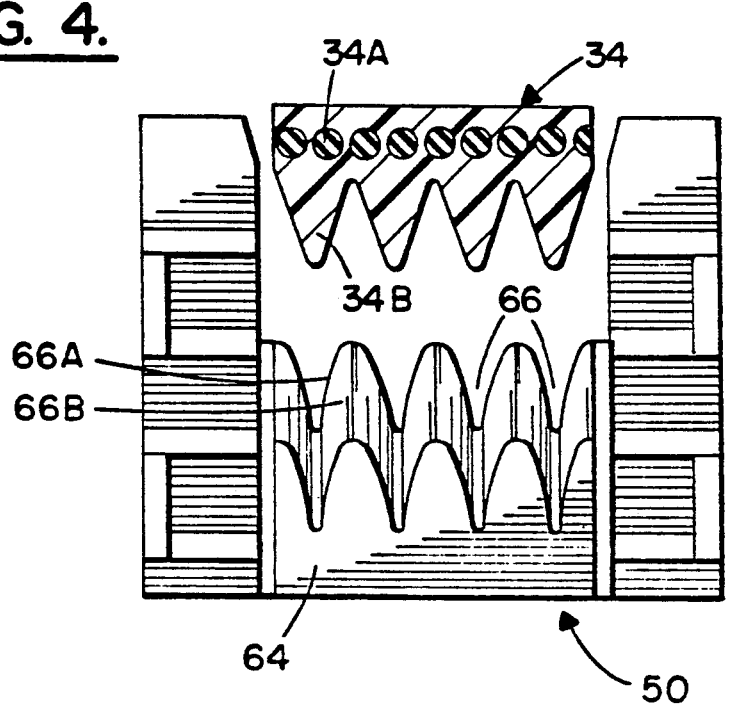
FIG. 4 is a side elevation view showing the multi-element cam/bearing means with the drive belt somewhat removed.

As shown in FIG. 3, the cam/bearing means 50 includes a grooved cap 64 adapted to receive an endless multi-V drive belt 34. Each of grooves 66 is adapted to mate with a V-section of the drive belt 34. However each groove 66 is dimensioned so that convexly curved sides 66A of plural parallel ribs 66B pinch the V-sections of the drive belt 34 as it passes therethrough. In a preferred form, as depicted in FIG. 4, the drive belt 34 includes a strength member 34A composed of arimid fibers, a material sometimes used for drive belts and noted for its flexibility over pulleys and strength and stiffness in tension. Bonded to the strength member in any suitable fashion is a friction member 34B composed of a high surface friction grade of moldable polyurethane, or equivalent, high friction, high abrasion resistant elastomeric material. While both urethane and arimid fibers have previously been used in belting applications, they have not, to the knowledge of the inventor, been used as a system in the manner presently disclosed. Thus, the belt 34 combines in one article a material which is flexible, strong and durable with another material which has superior friction characteristics as when it drivingly engages the wedging grooves in cap 64 of the cam bearing means 50. The combination of the high friction and outstanding abrasional resistance of urethane, the flexible strength characteristics of arimid fibers, aggressive pinching action of the belt and sheave groove geometry, and high angular wraparound make a lightweight, long-lasting, non-slip, and highly efficient belt drive possible.

It should be mentioned that while the sides 66A of the ribs 66B of cap 64 have been described as being convex and the sides of the mating V-sections of the drive belt 34 are illustrated in FIG. 4 as being straight or planar whereby an aggressive pinching action therebetween is achieved, a reverse construction would achieve the same result. It would also be within the scope of the invention for both sides of the V-section of the drive belt 34 and the mating sides of the ribs 66B to be convexly curved.

A primary consideration in the design of the present invention is reducing or eliminating slippage between the belt and sheave segments. The movement, support and placement of an idler member 67 (FIG. 2) which guides the belt 34 as it advances into engagement with successive sheave segments 32 is of great importance in reaching this end. Force applied to the pedal crank 24 causes the rear drive mechanism 30 to be rotated along with the sheave segments 32. Sheave segments 32, as they rotate, impart a force on belt 34 which transmits motion to the rear drive mechanism 30 through its segments. The amount of force that can be applied to the pedal crank without slippage of the belt relative to segments can be expressed as a function of the tension forces applied to the belt on the "tight" and "slack" sides of the rear drive mechanism 30 by the pedal crank in accordance with the following formula:

$$T_1/T_2 = e^{\mu\theta}$$

wherein $T_1$ is the tension on the "tight" side of the belt (the upper belt run in FIG. 2 with forward pedalling); $T_2$ is the tension on the "slack" side of the belt (the lower belt run in FIG. 2 with forward pedalling); e is the base of Naperian or natural logorithms; $\mu$ is the coefficient of friction between the belt and sheave segments; and $\theta$ is the total angle (in radians) of belt contact (or wrap) around the sheave segments. As can be seen from the above formula, the ratio of $T_1/T_2$ depends on the extent of belt wrap in a given system, and, further, since belt wrap $\theta$ is an exponential factor in the formula and multiplied by the coefficient of friction $\mu$, small incremental increases in the extent of both belt wrap and coefficient of friction will generate exceedingly large increases in the amount of force that can be placed on the pedal crank before slippage or impending slippage occurs.

It can be appreciated, in the environment of the variable ratio drive mechanism disclosed herein, that a sufficient degree of belt wrap to reduce undesirable slippage has to be accomplished in a very small space adjacent the periphery of the sheaves, a space that also contains several other components of the overall system. Further, the positions of the idler members have to accommodate many ratios, such as 21 discrete ratios in the transmission described. To accomplish this, idler member 67 is suitably supported for movement to obtain the degree of wrap desired. Because of the exponential relationship between amount of wrap and slippage of the belt in the sheave segments, this relatively small increase in wrap permits very large increases in traction and power without slippage occurring. In addition, little or virtually no tension need be kept on the belt during the time the transmission is not in use. This advantageously reduces wear and tear on the belt and on the sheave bearings.

Figure 4A:
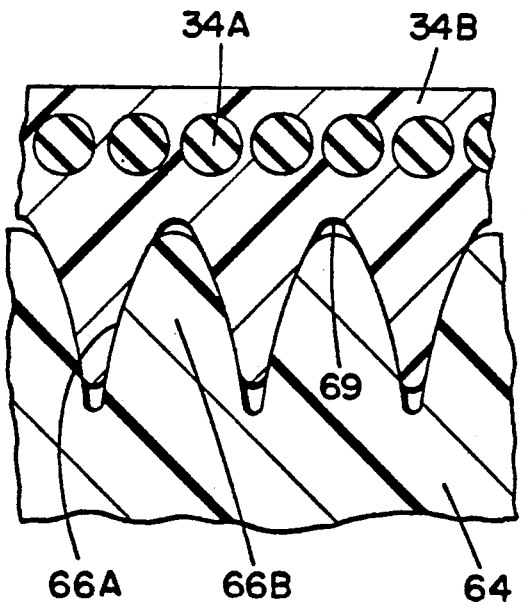
FIGS. 4A and 4B are detail cross sectional views illustrating certain parts depicted in FIG. 4, showing, respectively, the drive belt moderately engaged with the grooved cap of the cam bearing means and the drive belt engaged with the grooved cap to a maximum extent.
Figure 4B:
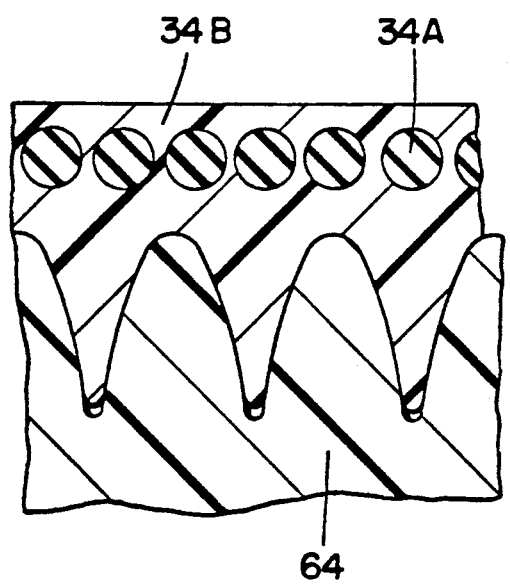

FIGS. 4A and 4B are particularly helpful in describing the relationship of the belt 34 with the grooved cap 64 during operation of the transmission 12. The belt 34 is manufactured to strict tolerances to assure a proper mating relationship with the ribs 66B of cap 64. As previously noted, there is a pinching or wedging effect which occurs between the V-sections of the drive belt 34 and the convex sides 66A of the ribs 66B of the cap 64. This wedging effect is continuous between light and heavy operating conditions.

As indicated in FIG. 4A, there is customarily a gap 69 present between the tip portions of the ribs 66B and the crotch region of the V-sections of the drive belt 34. This gap 69 is moderately large as the drive belt 34, viewing FIG. 2, advances around the idler member 67, then onto the sheave segments 32 in a clockwise direction. By the time the belt 34 leaves the last sheave segment 32, however, the tension in the belt will have increased to the extent that there is no longer any discernible gap 69 and this condition is depicted in FIG. 4B. However, it will be noted that even when the latter condition exists, the extremities of the V-sections of the drive belt 34 will not have reached the deepest region of the crotch between adjacent ribs 66B. Thus, the radial inward movement of the belt 34 as it advances in engagement with the grooved caps 64 of the sheave segments 32 is limited and of such a nature that it can be said the belt 34 is self limiting in this regard, whether under light loading or under heavy loading. This self limiting design is a significant improvement over conventional V-belts which sometimes became wedged to such an extent that it required substantial force to remove the belt from the pulley at its point of exit from the pulley.

Furthermore, by reason of the close tolerances between the belt 34 and the ribs 66B, the amount of radial movement of the belt on the sheave segments 32 between a condition of maximum gap 69 and no gap at all is minimized. This is a desirable feature to assure control between a desired and an actual drive ratio It is also worthy of note that while multiple V-section belts were previously known, they were usually used as wide belts and their multiple belt teeth served only to prevent the belt from wandering laterally off the pulley. For all intents and purposes, therefore, they were really flat belts Furthermore, such belts were customarily fabricated of neoprene, or of other conventional materials which would wear quickly if subjected to the pinching or wedging effect called for by the present invention.

It will further be appreciated, however, that the benefits of the invention need not be restricted to the construction of a multiple V-section drive belt. Indeed, as illustrated in FIG. 4C, a modified drive belt 34C having only one V-section may be frictionally engageably received between a pair of parallel ribs 66B on the grooved cap 64. In this instance, the drive belt 34C is provided with a pair of spaced apart shoulders 34D which engage the tip portions of the ribs 66B and prevent the V-section of the drive belt from reaching the deepest region of the crotch or terminal surface 66C between the adjacent ribs 66B.

Figure 4D:
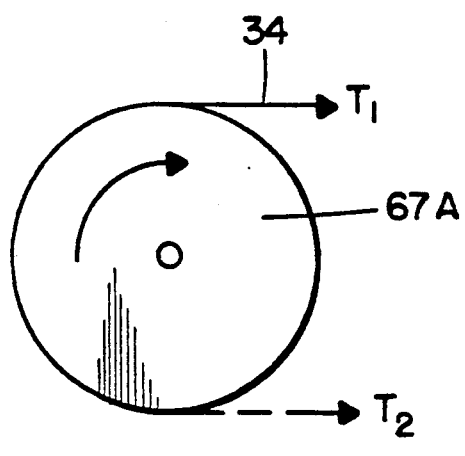
FIGS. 4D and 4E are diagrammatic side elevation views illustrating, respectively, a belt engaged with a pulley having a 180° wrap therearound and a 270° wrap therearound.
Figure 4E:
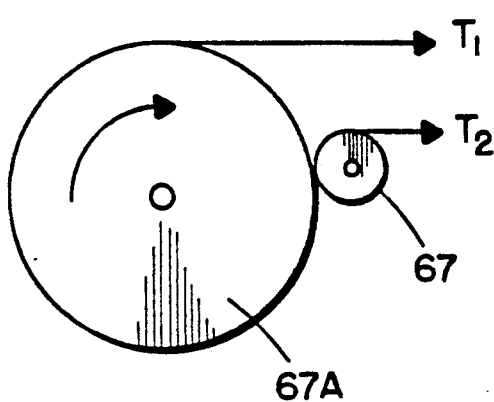
Figure 4C:
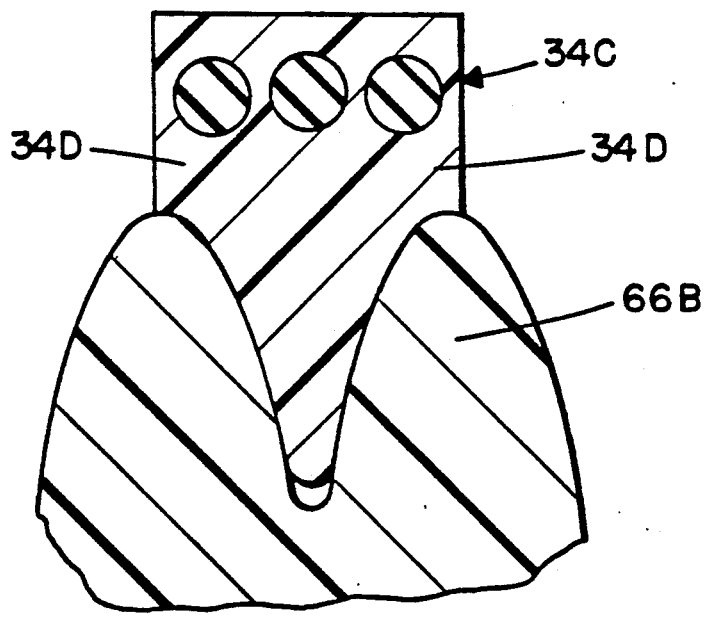
FIG. 4C is a detail cross sectional view of a modified drive belt engaged with the grooved cap of the cam bearing means.

The significant advance of the present invention over the state of the art can be even more fully appreciated if reference is made to FIGS. 4D and 4E in conjunction with the following examples FIG. 4E is a diagrammatic presentation of the drive belt 34 engaged with a main pulley 67A and is generally representative of the condition illustrated in FIG. 2 with the belt engaged with successive sheave segments 32 of the rear drive mechanism 30 and with idler member 67. By reason of the idler member 67, the angle of wrap of the drive belt 34 on the pulley 67A is 270° FIG. 4D is similar to FIG. 4E but is absent idler member 67 with the result that the angle of wrap is only 180°.

The measure of efficiency of usage of any given belt is provided by the expression $(T_1-T_2)T_1$. The following examples assume $T_2$ to be one pound. $T_1$, which is the drawing force on the belt 34 at the point of slipping, is then solved for, using the previously mentioned formula, $T_1/T_2 = e^{\mu\theta}$; then, efficiency is determined:

EXAMPLE 1

Belt 34 is plain neoprene (conventional belting material); there is no wedging.
$\mu = 0.3$; $\theta = \pi$
$T_1 = 2.6$
$(T_1-T_2)/T_1 = 61\%$

EXAMPLE 2

Belt 34 is plain neoprene; there is wedging
$\mu = 1.2$; $\theta = \pi$
$T_1 = 43$
$(T_1-T_2)T_1 = 98\%$

EXAMPLE 3

Belt 34: polyurethane; wedging
$\mu = 1.8$; $\theta = \pi$
$T_1 = 286$
$(T_1-T_2)/T_1 \approx 100\%$

EXAMPLE 4

Belt 34: plain neoprene; no wedging
$\mu = 0.3$; $\theta = 1.5\pi$
$T_1 = 4.1$
$(T_1 = T_2)/T_1 \approx 76\%$

EXAMPLE 5

Belt 34: plain neoprene; wedging
$\mu = 1.2$; $\theta = 1.5\pi$
$T_1 = 286$
$(T_1-T_2)/T_1 \approx 100\%$

EXAMPLE 6

Belt 34: polyurethane; wedging
$\mu = 1.8$; $\theta = 1.5\pi$
$T_1 = 4,829$
$(T_1-T_2)/T_1 \approx 100\%$ When analyzing the above examples, the significance of the use of polyurethane for the friction member and the benefit of wedging can be readily seen from Example 3 which results from a 180° angle of wrap of the drive belt 34 on the pulley 67A. However, even this improvement can be achieved using conventional neoprene when the wrap angle is increased to 270°, witness Example 5. However, the significance of the invention can be fully appreciated from Example 6 wherein, using polyurethane and a wrap angle of 270°, $T_1$ is an exceptional 4,829 pounds for a $T_2$ of one pound. In actual fact, $T_2$ would be less than one pound, indeed, only a few ounces. Furthermore, it is noteworthy that while the use of neoprene with wedging itself results in a significant improvement over the prior art, neoprene does not have the toughness and abrasion resistance which would assure a long life. Indeed, the result indicated in Example 5 would be short-lived, maybe only a few thousand cycles compared with polyurethane, as in Example 6, which would have a lifetime of millions of cycles.

As seen in FIG. 3, outboard regions 68 of the grooved cap 64 are of greater curvature, that is have a smaller radius of curvature, viewed from the side, than an inboard region 70. This construction is provided to maximize the area of intimate contact of belt and cap to reduce potentially damaging shear stresses in the urethane while avoiding belt damage during shifting due to the exaggerated geometry of belt action in this mode as it advances onto or retreats from each successive sheave cap.

With continuing reference to FIG. 3, on either side of cap 64 there is an outwardly projecting multi-wedge cam, 72 and 74, respectively, each of which includes a plurality of successive, cooperating camming surfaces 76, 78. Right-rear engagement block 52 and left-forward engagement block 58 are mirror images of each other as are right-forward engagement block 54 and left-rear engagement block 58. Hereinafter, only right engagement blocks 52 and 54 will be discussed; however, it should be understood that left engagement blocks 56 and 58 have similar relations to each other and to cam/bearing means 50 and operate in a substantially identical manner. This is true for springs 60 and 62, which are identical as well.

Each of the engagement blocks 52 and 54 has a plurality of successive, cooperating follower surfaces 80, 82 which slidably mate with various of the surfaces on multi-wedge cam 72. While engagement blocks 52 and 54 are shown in FIG. 3 as being removed from multi-wedge cam 72, under normal circumstances, they are juxtaposed to each other. Thus, when multi-element wedge cam 72 moves either up or down, the follower surfaces 80, 82 of engagement blocks 52, 54 are caused to slide along the camming surfaces 76, 78 so as to cause them to move outwardly.

Simultaneously, the inward looking surfaces 84 of the wedge cam 72 interact with outward looking surfaces 86 to provide loose retention of the engagement blocks under all possible conditions.

The engagement block 52 is provided with a transverse extending shoulder 88 which is formed with a transverse extending bore 90. A nubbin 92 with opposed undercut surfaces 94 projects from an uppermost surface of the shoulder 88. The engagement block 54, in contrast, is provided with a somewhat diminished shoulder 96 extending transversely in the direction of the engagement block 52. An elongated dowel 98 is joined lengthwise to the shoulder 96 by means of a spine 100 which is coextensive with the length of the dowel. In its turn, the engagement block 52 is provided with a longitudinally extending slot 102 which communicates with the blind bore 90 in a coextensive fashion. The blind bore 90 is slightly larger in diameter than the dowel 98 and the slot 102 is slightly larger than the spine 100 thereby enabling the engagement blocks 52, 54 to be joined with the blind bore 90 slidably receiving the dowel 98. However, before they are joined, the spring 60, referred to above, is slidably received within the blind bore 90 after which the dowel 98 is inserted. Thus, it will be appreciated that while the spring 60 biases the engagement blocks 52, 54 apart; they otherwise retain their relative relationship.

Although the dowel 98 is illustrated as being cylindrical and the bore 90 as being circular in a complementary fashion, any other suitable construction of parts could be used for the same purpose. For example, the dowel could have a triangular or square or other polygonal cross section with the bore being similarly shaped. Also, the spring 62 may be replaced by any other suitable resilient member.

Figure 5:
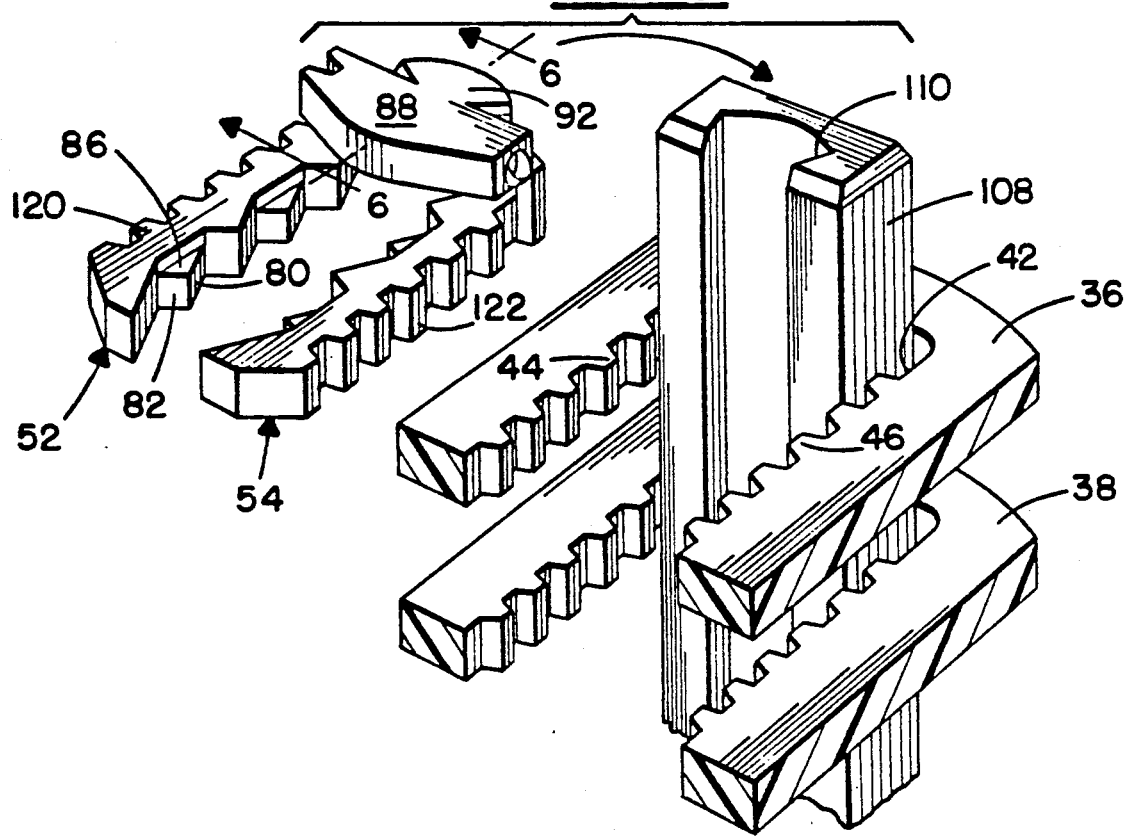
FIG. 5 is a perspective exploded view showing use of a tool for mounting a sheave segment into its associated drive mechanism.
Figure 6:
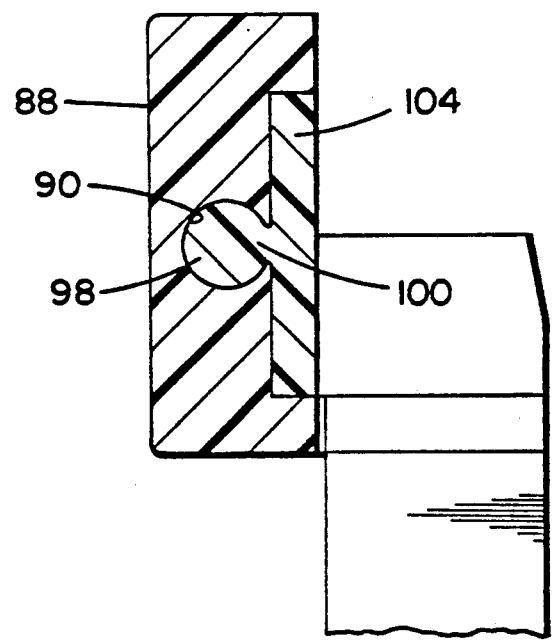
FIG. 6 is a cross section view taken generally along line 6—6 in FIG. 5.

While the engagement block 54 is not provided with a nubbin 92 in the manner of the engagement block 52, it does have an integral holding element 104 with an undercut surface 106 which generally conforms to the undercut surface 94 of the nubbin 92 when the engagement blocks 52, 54 are joined together. The holding element 104 has no purpose in the operation of the drive mechanism of the invention but is important for purposes of installing the sheave segment 32 into its associated disks 36, 38. This function is particularly well illustrated in FIGS. 5 and 6. In FIG. 5, a tool 108 is depicted as extending laterally through associated toothed slots 42 in the disks 36, 38. The tool 108 is provided with a longitudinally extending slot 110 which is shaped to slidably receive a nubbin 92 and the holding element 104 of the engagement blocks 52, 54, respectively, when they are held together so that the undercut surfaces 94 and 106 are in a substantially coplanar, contiguous, relationship. The shape of the slot 110 prevents movement of the sheave segment assembly in all directions except longitudinally of the slot 110. When the sheave segment assembly is moved so as to be coplanar with an associated disk 36, 38, the tool is slidably removed, lengthwise, and the spring 60 biases the engagement blocks 52, 54 so that they engage, respectively, the teeth 44, 46 of their associated disk.

When engagement blocks 52, 54, are brought into juxtaposition with multi-wedge cam 72, follower surfaces 80, 82 on the engagement blocks 52, 54 loosely engage the camming surfaces 76, 78 of the multi-wedge cam 72. A similar situation prevails in the instance of the engagement blocks 56, 58 and their associated multi-wedge cam 74. Additionally, the outward looking surfaces 86 on the engagement blocks are positioned contiguous with the inward looking surfaces 84 on their associated multi-wedge cam. This nesting relationship prevents any relative movement of the multi-wedge cams 52, 54 in a direction orthogonal to the surfaces of the multi-wedge cam 72 and, similarly, of the engagement blocks 56, 58 relative to the multi-wedge cam 74.

Figure 8:
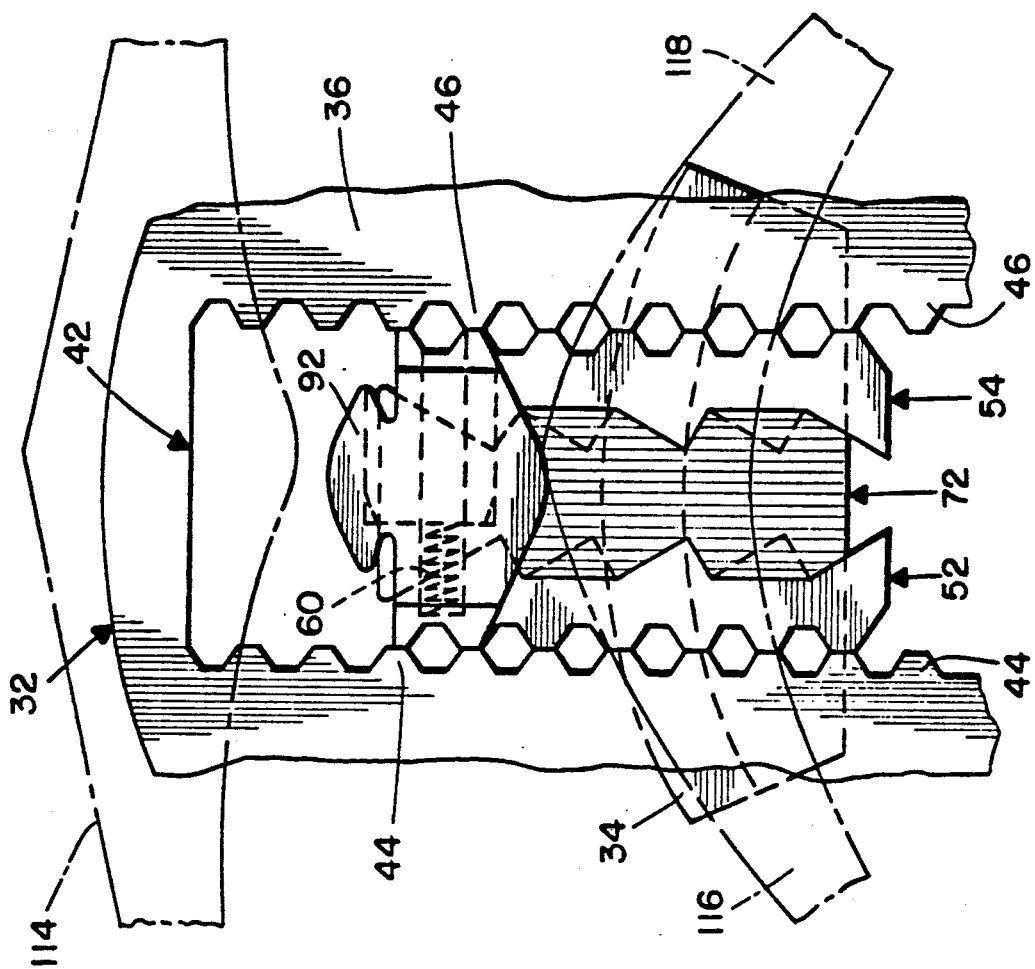
FIG. 8 is a side elevation view of a sheave segment when engaged by shift cams of the shift mechanism.
Figure 7:
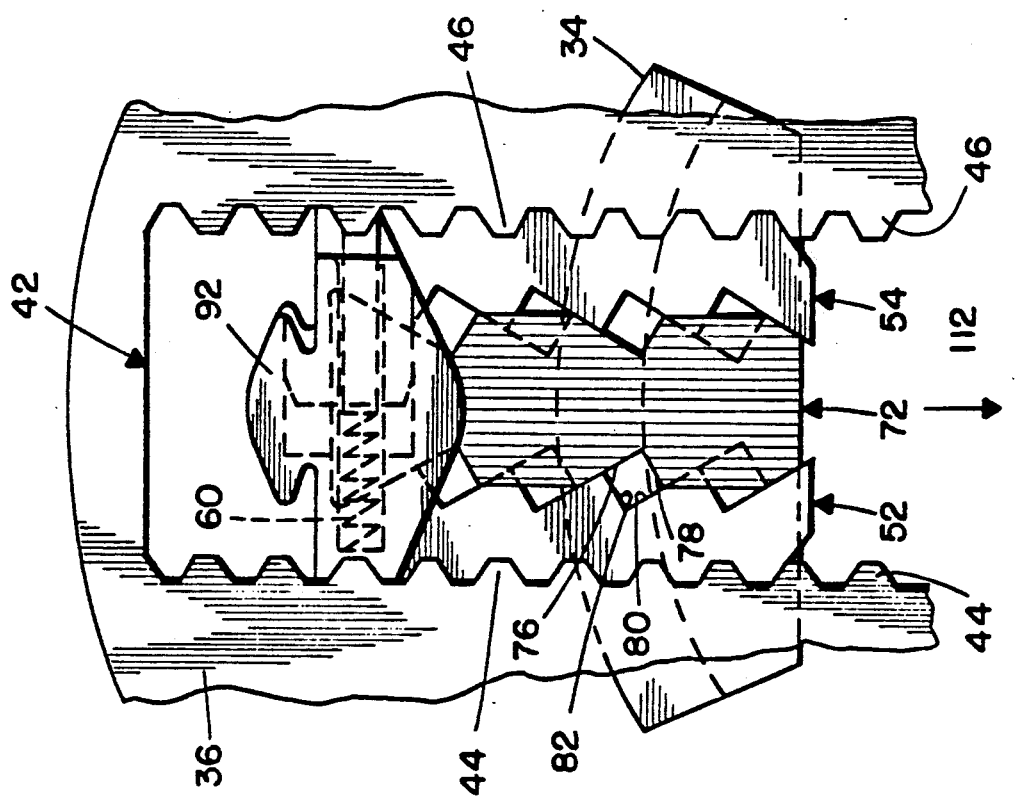
FIG. 7 is a side elevation view of a sheave segment when engaged with the drive belt.

Referring now to FIGS. 7 and 8, the operation of a sheave segment 32 will be described. As shown in FIG. 7, it is initially assumed that belt 34 overlies cap 64 and exerts a radial inward force thereon as indicated by arrow 112. As a result, the various camming surfaces 76 of multi-wedge cam 72 exert an outward pressure on engagement blocks 52 and 54. In FIGS. 7 and 8, the outermost surface of wedge cam 72 has been vertically cross-hatched to allow the viewer to distinguish it from the other elements of the drawings. Thus, it can be seen that the camming surfaces 76 of the wedge cam 72 exert pressure on the engagement blocks 52 and 54 and cause their respective teeth to interlock with the tooth-like formations on the track. So long as belt 34 continues to exert pressure, as indicated by arrow 112, engagement blocks 52 and 54 are not free to move. When, however, disk 36 rotates to position where the sheave segment 32 is disengaged from belt 34, it is then disposed to be moved. However, until nubbins 92 engage the shift cams 114, 116, springs 60 tend to maintain engagement blocks 52 and 54 pressed against tooth-like formations 44 and 46.

Under steady-state (i.e. when no shifting is performed) conditions and in those regions in which the belt is disengaged from the segments 32, the segments will float freely within the confines of the collective follower surfaces 76, 78, 80 and 82, being urged to move under the resultant of gravitational and centrifugal forces. In contrast to the present inventor's previous U.S. Pat. No. 4,832,660, the addition of follower surfaces 78 and 82 serve to inhibit "fly-out" of segments 32 under all expected operating conditions, wherein centrifugal forces act on the segments to cam the blocks outward (towards their segment-locking positions). However, during shifting, segments must be forced radially inward against centrifugal forces, which act on all segments (and engagement blocks) as long as rotation exists. This contrasts with segment lock-up conditions under belt-loading, which must be positively self-locking under all conditions.

In short, the springs 60 provide a modest detenting force which can be overcome by modest shifting forces. At the same time, the system becomes locked in response to extremely large belt moving forces and nominal centrifugal forces, both of which substantially exceed the modest detenting force just mentioned.

In FIG. 8, belt 34 is no longer engaged with cap 64 and disk 36 has rotated so that sheave segment 32 is in the vicinity of shift cams 113, 116. In this instance, nubbin 92 is in contact with surface 118 of shift cam 116 and is thereby forced in a radially outward direction by the rotation of disk 36. The upward movement of nubbin 92 is imparted to both engagement blocks 52, 54 by reason of their unitary joined condition. As a result, both engagement blocks 52 and 54 are moved in a radially outward direction. As nubbin 92 rides up on surface 118, teeth 120, 122 on the engagement blocks 52, 54, respectively, disengage from tooth-like formations 44 and 46 and the spring 60 is further compressed. This action thereby forces the cam/bearing means 50 to also move upwardly, by one or more full teeth. This action continues until nubbin 92 no longer contacts gate cam 154 on subsequent rotation of the disks 36, 38, whereby the engagement blocks are again seated as shown in FIG. 7.

A similar action occurs if shift cam 114 is lowered into engagement with nubbin 92 during its rotational movement. Nubbin 92 is thus caused to push, through engagement block 52, on engagement block 54. It should be understood that while the action of shift cams 114 and 116 have been described with respect to nubbin 92, an identical pair of shift cams are present on the opposite side of the drive disks and engage the nubbins attached to engagement blocks 56 and 58 (see FIG. 3). Thus, there is an equal and identically directed camming action exerted on both sides of the sheave segment at all times that it is being acted upon by the shift mechanism.

Another embodiment of the invention is depicted in FIGS. 9, 10, 11, and 12. In this embodiment, a cam bearing means 50A which is somewhat modified from the cam bearing means 50 previously described is straddled by a first pair 130 of modified engagement blocks 52A, 56A, and a second pair 132 of modified engagement blocks 54A, 58A. The engagement blocks 52A, 56A are connected by a transversely extending cross bar 134 and, in similar fashion, the engagement blocks 54A, 58A are connected by a transversely extending cross bar 136. By reason of this construction, the engagement blocks 52A, 56A, are of one piece, or integral, construction, lying in spaced apart parallel plans coincident, respectively, with the planes of the disks 36A, 38A. The engagement blocks 54A, 58A are similarly configured and positioned.

In other aspects as well, the embodiment of FIGS. 9-12 is somewhat modified from the construction illustrated in FIG. 3. In this regard, both of the engagement blocks 52A, 56A are provided with nubbins 138, 140 integral therewith and positioned intermediate, by substantially equal distances, radially inner and outer ends 142, 144, respectively. Each nubbin 138, 140 is formed with a circumferentially extending shoulder, each formed with a circumferentially extending blind bore 146, 148, respectively. For their part, the engagement blocks 54A, 58A, are each provided with somewhat diminished shoulders 150, 152, respectively, extending circumferentially in the direction of their associated engagement blocks 52A, 56A. An elongated dowel 154 is slidably received in the blind bore 146 and an elongated dowel 156 is slidably received in the blind bore 148. In this manner, the nubbins 138, 140 are operatively joined to the shoulders 150, 152, respectively. However, before the nubbins and their associated shoulders are joined, compression springs 158, 160 are slidably received within the respective blind bores 146, 148 after which their associated dowels are inserted. As with the construction of FIG. 3, the engagement blocks 52A, 54A retain their relative relationship throughout their slidable relative movement, and the same can be said with respect to engagement blocks 56A, 58A.

By reason of the construction just described, the forces acting on the right engagement blocks 52A, 54A are balanced with those acting on the left engagement blocks 56A, 58A as a sheave segment passes through a gate providing symmetrical geometry, which is highly desirable. The construction also substantially improves the ease of assembly of the apparatus because of the substantial reduction of parts whose relative positioning is critical to the operation of the invention.

Additional expedients may be utilized to minimize the angular cocking or canting of a sheave segment as it advances and to minimize the undesirable effects of such canting. In one instance, the pitch of teeth 44A in a modified disk 36A may be substantially reduced from the pitch of the teeth 44 as illustrated in FIG. 3.

Furthermore, in conjunction with the central positioning of the nubbins between the inner and outer ends of their associated engagement blocks, lateral surfaces of the multiwedge cams 72A and 74A associated with the cam bearing means 50A and the lateral surfaces of the engagement blocks 52A, 54A, 56A, and 58A are modified as will now be described. For ease of description, the modifications will be described with reference to only one of the multiwedge cams and to only one of the engagement blocks, but will be understood to be applicable to all of the other such components.

Figure 9:
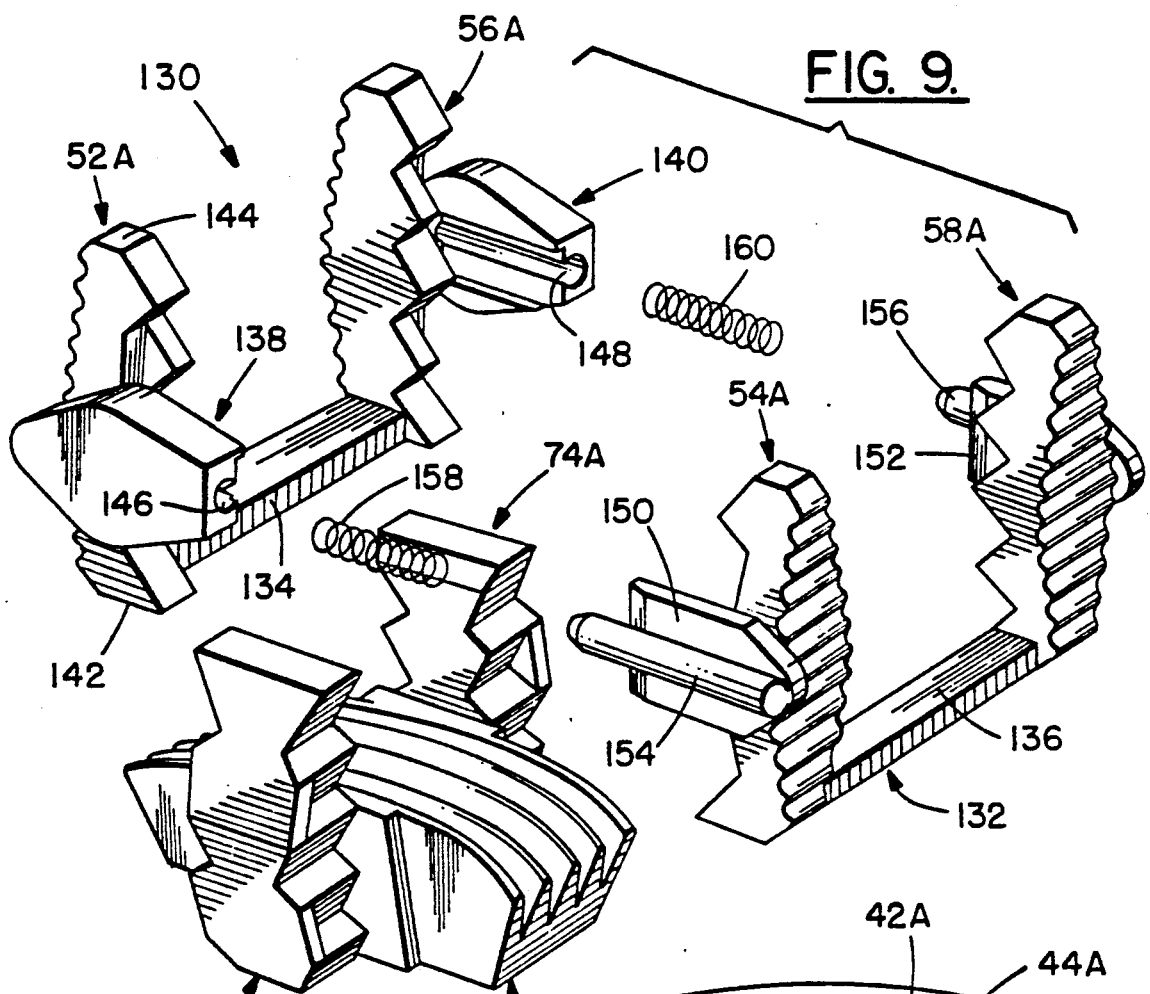
FIG. 9 is a perspective exploded perspective view of a modified segment for use by the invention.
Figure 10:
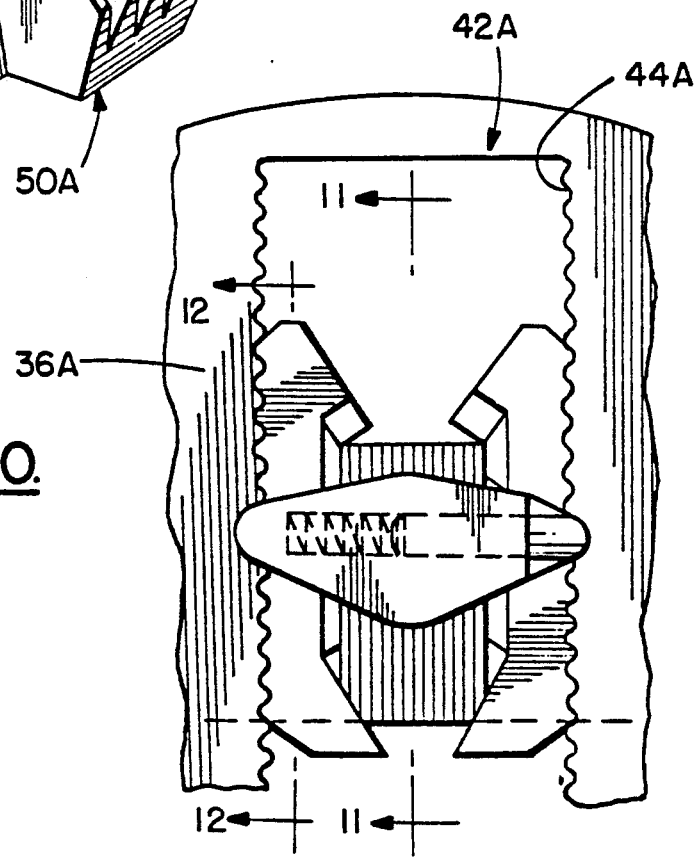
FIG. 10 is a side elevation view of the sheave segment illustrated in FIG. 9.
Figure 11:
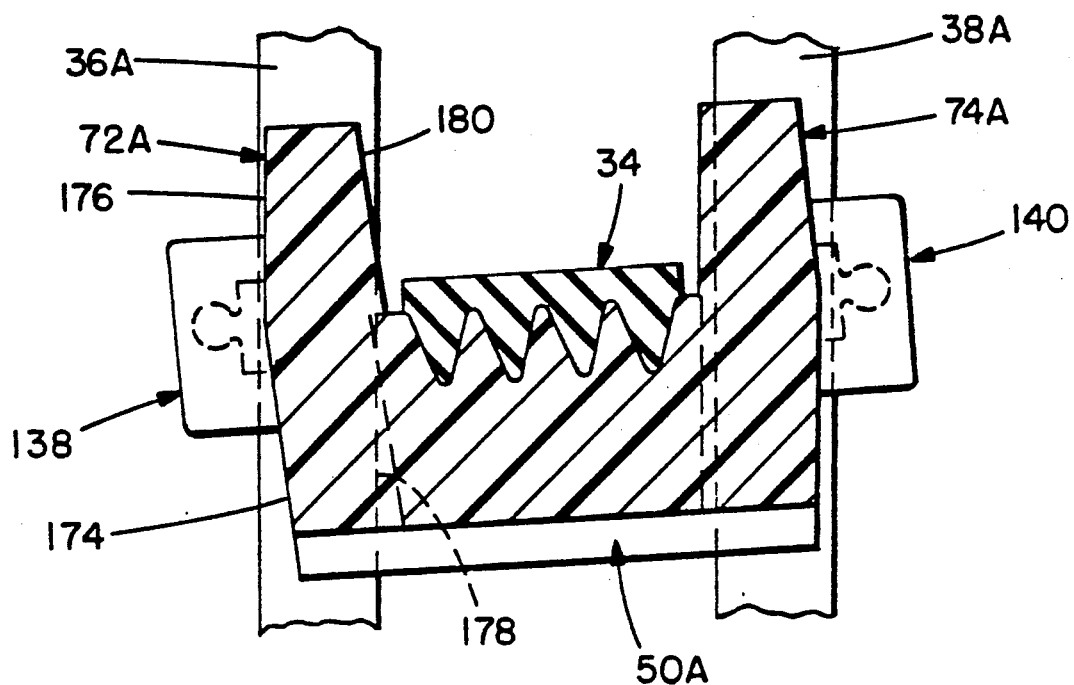
FIG. 11 is a cross section view taken generally along line 11—11 in FIG. 10.
Figure 12:
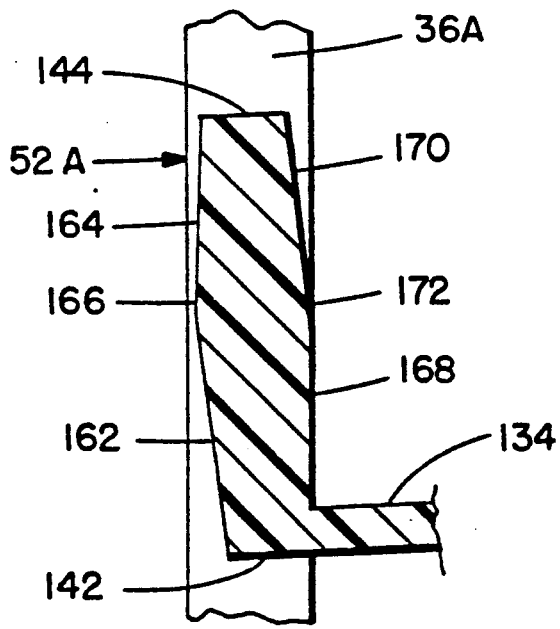
FIG. 12 is a cross section taken generally along 12—12 in FIG. 10.

With primary attention to FIGS. 9 and 12, dimensioning of the engagement block 52A is preferably chosen such that its width centrally of its ends 142, 144 is substantially equivalent to the thickness of its associated disk 36A. Furthermore, its outer surfaces 162, 164 taper, respectively, from a central location 166 to their respective ends 142, 144. Similarly, each of the engagement blocks 52A has inner surfaces 168 which taper from a central location 172 toward their respective narrowed ends 142, 144.

With this construction, if the pair 130 of engagement blocks is canted in the manner previously described, the outer and inner surfaces of the engagement block 52A will, nevertheless, remain substantially within the confines of the radial slots 42A in the disk 36A.

In similar fashion, the multi-wedge cam 72A (FIG. 11) has outer surfaces 174, 176 and inner surfaces 178, 180 which are convergently tapered toward radially inner and outer ends, respectively. As in the instance of the engagement block 52A, a central, widest region of the multi-wedge cam 72A is substantially the same width as that of its associated disk 36A. As can best be seen in FIG. 11, upon canting of the sheave segment including the cam bearing means 50A such that the multi-wedge cam 72A on the drive disk 36A is radially offset relative to the multi-wedge cam 74A on the drive disk 38A, the inner and outer surfaces of the cam 72A (and, or course, on cam 74A as well) remain substantially coextensive with the inner and outer surfaces of its associated drive disk.

An added benefit of the tapered design just described is to assure maximum strength for all teeth while assuring that there is no undesirable overhang of component parts beyond the respective widths of the drive disks 36A, 38A.

The foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Variable ratio drive apparatus comprising:
    a rotatably mounted drive mechanism including a pair of spaced apart generally parallel drive disks, each of said disks having a plurality of correlated side-by-side circumferentially spaced radially extending elongated tracks with opposed tooth-like formations therein;
    an endless drive member extending in directions generally parallel to said drive disks;
    a movable sheave segment mounted in association with each of said tracks, each said sheave segment including cam/bearing means and first and second pairs of one piece opposed engagement blocks, said cam/bearing means having at least one camming surface associated with each of said pairs of engagement blocks and independently movable radially relative to each of said pairs of engagement blocks, said cam/bearing means engaged by said endless drive member when said drive mechanism is outside a predetermined arc of rotation, to rigidly bias each of said pairs of engagement blocks against an associated one of said tooth like formations; and
    resilient means interposed between said pairs of first and second engagement blocks for biasing said engagement blocks into engagement with said tracks.

2. Variable ratio drive apparatus comprising:
    a rotatably mounted drive mechanism including a plurality of pairs of laterally and circumferentially spaced radially extending elongated tracks with opposed tooth like formations therein;
    an endless drive member;
    a movable sheave segment mounted in association with each of said tracks, each said sheave segment including cam/bearing means and first and second pairs of one-piece opposed engagement blocks, said cam/bearing means having at least one camming surface associated with each of said pairs of engagement blocks and independently movable radially relative to each of said pairs of engagement blocks, said cam/bearing means engaged by said endless drive member when said drive mechanism is outside a predetermined arc of rotation, to rigidly bias each of said pairs of engagement blocks against an associated one of said tooth like formations; and
    resilient means interposed between said pairs of first and second engagement blocks for biasing said engagement blocks into engagement with said tracks.

3. Variable ratio drive apparatus as set forth in claim 2 including:
    mutually engageable key means on each of said first and second pairs of engagement blocks for guiding said engagement blocks between one position engaged with said tooth like formations and another position disengaged form said tooth like formations.

4. Variable ratio drive apparatus as set forth in claim 3
    wherein each of said first and second pairs of engagement blocks includes:
    a plurality of toothed members intimately engageable with an associated one of said associated pairs of tooth like formations on said elongated tracks; and
    wherein each of said key means includes:
    an elongated pin on each of said first engagement blocks extending transverse of said teeth thereon;
    each of said second engagement blocks having an elongated bore extending transverse of said teeth thereon for slidable reception of said associated elongated pin; and
    wherein said resilient means is a compression spring received in each of the bores and is coaxial therewith.

5. Variable ratio drive apparatus as set forth in claim 4
    wherein said first and second pairs of engagement blocks and said tooth like formations lie in substantially parallel spaced apart planes.

6. Variable ratio drive apparatus as set forth in claim 2 including:
    nubbin means associated with each of said first engagement blocks; and
    shift means for engaging said nubbin means and overcoming the bias of said resilient means to cause movement of said sheave segment, said shift means positioned to engage said nubbin means inside said predetermined arc of rotation.

7. Variable ratio drive apparatus as set forth in claim 2
wherein each of said pairs of engagement blocks includes:
a plurality of toothed members intimately engageable with an associated one of said tooth like formations on said elongated tracks; and
a plurality of follower surfaces, each adapted to be engaged by a camming surface of said cam/bearing means, each said follower surface oriented, when engaged by a camming surface, to force its associated toothed engagement block into rigid engagement with an associated one of said tracks.

8. Variable ratio drive apparatus as set forth in claim 7
wherein said cam/bearing means and said toothed members have interlocking surfaces which prevent relative movement therebetween in a direction orthogonal to a major planar surface of said rotatably mounted drive mechanism.

9. Variable ratio drive apparatus as set forth in claim 8
wherein said cam/bearing means comprises a plurality of wedge cams.

10. Variable ratio drive apparatus as set forth in claim 9
wherein each of said pairs of engagement blocks includes:
a right engagement block;
a left engagement block lying in a plane spaced from and generally parallel to said right engagement block; and
a bar integrally joining said right and left engagement blocks;
whereby said right and left engagement blocks move in unison relative to said cam bearing means.

11. Variable ratio drive apparatus comprising:
a rotatably mounted drive mechanism including first and second spaced apart generally parallel drive disks, each of said drive disks having opposed inner and outer surfaces and a plurality of pairs of circumferentially spaced radially extending elongated tracks with opposed tooth like formations therein extending between said inner and outer surfaces;
an endless drive member;
a movable sheave segment mounted in association with each of said tracks, each said sheave segment including cam/bearing means and first and second pairs of opposed engagement blocks extending between radially inner and outer ends, said cam/bearing means having at least one camming surface associated with each of said pairs of engagement blocks and independently movable radially relative to each of said engagement blocks, said cam/bearing means engaged by said endless drive member when said drive mechanism is outside a predetermined arc of rotation, to rigidly bias each of said pairs of engagement blocks against an associated one of said tooth like formations;
resilient means interposed between said pairs of first and second engagement blocks for biasing said engagement blocks into engagement with said tracks;
nubbin means on each of said first engagement blocks intermediate said radially inner and outer ends thereof by substantially equal distances; and
shift means for engaging said nubbin means and overcoming the bias of said resilient means to cause movement of said sheave segment, said shift means positioned to engage said nubbin means inside said predetermined arc of rotation.

12. Variable ratio drive apparatus as set forth in claim 11 including:
mutually engageable key means on each of said first and second pairs of engagement blocks for guiding said engagement blocks between one position engaged with said tooth like formations and another position disengaged from said tooth like formations.

13. Variable ratio drive apparatus as set forth in claim 12
wherein each of said first and second pairs of engagement blocks includes:
a plurality of toothed members intimately engageable with an associated one of said associated pairs of tooth like formations on said elongated tracks; and
wherein each of said key means includes;
an elongated pin on each of said first engagement blocks extending transverse of said teeth thereon;
each of said second engagement blocks having an elongated bore extending transverse of said teeth thereon for slidable reception of said associated elongated pin; and
wherein said resilient means is a compression spring received in each of the bores and is coaxial therewith.

14. Variable ratio drive apparatus as set forth in claim 13
wherein said first and second pairs of engagement blocks and said tooth like formations lie in substantially parallel spaced apart planes.

15. Variable ratio drive apparatus as set forth in claim 11
wherein each of said pairs of engagement blocks includes:
a plurality of toothed members intimately engageable with an associated one of said tooth like formations on said elongated tracks; and
a plurality of follower surfaces, each adapted to be engaged by a camming surface of said cam/bearing means, each said follower surface oriented, when engaged by a camming surface, to force its associated toothed engagement block into rigid engagement with an associated one of said tracks.

16. Variable ratio drive apparatus as set forth in claim 11
wherein said tooth like formations on one of said drive disks are congruent to said tooth like formations on the other of said drive disks; and
wherein each of said engagement blocks has inner and outer surfaces and a width between said inner and outer surfaces adjacent said nubbin means substantially equal to the width between said opposed inner and outer surfaces of an associated one of said disks;
said inner and outer surfaces of each of said engagement blocks being convergently tapered toward said radially inner and outer ends, respectively;
whereby upon canting of one of said sheave segments such that said engagement block on said first drive disk is radially offset relative to said engagement block on said second drive disk, said inner and outer surfaces of said engagement blocks remain substantially coextensive with said inner and outer surfaces of said associated drive disks.

17. Variable ratio drive apparatus as set forth in claim 16
   wherein said cam/bearing means includes a pair of outwardly projecting multi-wedge cams; and
   wherein each of said multi-wedge cams has inner and outer surfaces and a width between said inner and outer surfaces adjacent said nubbin means substantially equal to the width between said opposed inner and outer surfaces of an associated one of said disks;
   said inner and outer surfaces of each of said multi-wedge cams being convergently tapered toward said radially inner and outer ends, respectively;
   whereby upon canting of one of said sheave segments such that said multi-wedge cam on said first drive disk is radially offset relative to said multi-wedge cam on said second drive disk, said inner and outer surfaces of said multi-wedge cams remain substantially coextensive with said inner and outer surfaces of said associated drive disks.

18. Variable ratio drive apparatus as set forth in claim 16
   wherein each of said first and second pairs of opposed engagement blocks are of one piece construction.

19. Variable ratio drive apparatus as set forth in claim 16
   wherein each of said pairs of engagement blocks includes:
   a right engagement block;
   a left engagement block lying in a plane spaced from and generally parallel to said right engagement block; and
   a bar integrally joining said right and left engagement blocks;
   whereby said right and left engagement blocks move in unison relative to said cam bearing means.

* * * * *